United States Patent [19]
Komatsu et al.

[11] 3,790,208
[45] Feb. 5, 1974

[54] SAFETY BELT

[75] Inventors: Noboru Komatsu; Choji Nozaki; Toshio Kurauchi; Toshihiko Sakai, all of Nagoya, Japan

[73] Assignee: Kabushiki Kaisha Toyota Chuo Kenkyusho, Nagoya, Japan

[22] Filed: June 7, 1972

[21] Appl. No.: 260,615

Related U.S. Application Data
[63] Continuation-in-part of Ser. No. 97,989, Dec. 14, 1970, abandoned.

[52] U.S. Cl.................. 297/386, 297/389, 188/1 C
[51] Int. Cl............................................. A62b 35/60
[58] Field of Search ..... 297/386; 188/1 C; 260/92.2

[56] References Cited
UNITED STATES PATENTS

| | | | |
|---|---|---|---|
| 3,198,288 | 8/1965 | Presunka | 297/386 X |
| 3,680,913 | 8/1972 | Seybold | 297/386 |
| 3,532,380 | 10/1970 | Studer et al. | 297/386 |
| 3,232,383 | 2/1966 | Moberg | 297/386 |
| 3,561,819 | 2/1971 | Renneker | 297/386 |
| 3,380,557 | 4/1968 | Peterson | 188/1 C |
| 2,724,463 | 11/1955 | Becker | 297/386 X |
| 3,398,812 | 8/1968 | Peterson | 297/386 X |

FOREIGN PATENTS OR APPLICATIONS

| | | | |
|---|---|---|---|
| 965,836 | 9/1962 | Great Britain | 188/1 C |

OTHER PUBLICATIONS
Properties of Rigid and Semi-Rigid Urethane Foams; Aug. 1957.

E. Tufts Handbook of Foamed Plastics; Lake Publishing Corp.; 1965.

*Primary Examiner*—James T. McCall
*Attorney, Agent, or Firm*—Blum, Moscovitz, Friedman & Kaplan

[57] ABSTRACT

A safety belt for tightly holding an occupant of a seat for vehicles such as an automobile, said safety belt being equipped with a shock absorbing means having a rigid plastics foam body, a receptacle with a uniform cross-section and a bottom plate, and a pusher having a tapering face the projected area of which is less than 70 percent of the cross-sectional area of said plastics foam body, said foam body being held in said receptacle between the pusher and the bottom plate, said pusher being movable toward said bottom plate when a tension is generated by the movement of an occupant supported by the belt so that said plastics foam body is deformed and displaced by the passage of said pusher and the kinetic energy developed by the movement of the occupant is absorbed.

17 Claims, 19 Drawing Figures

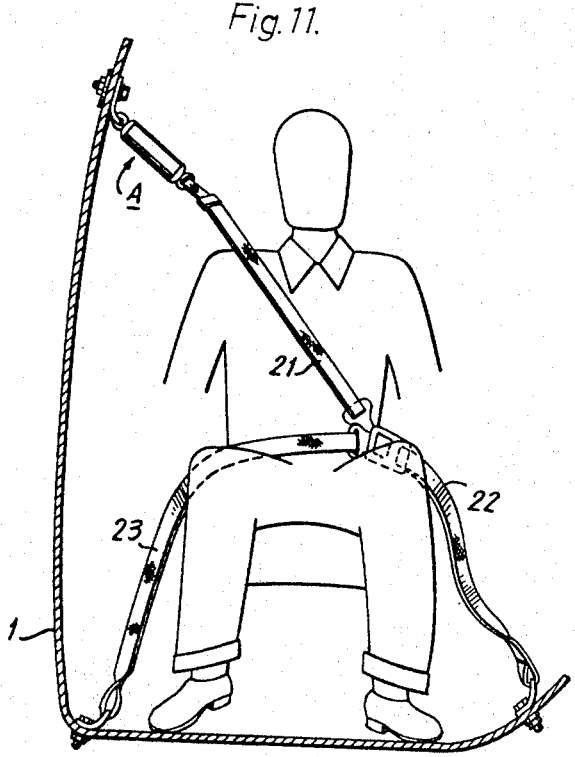
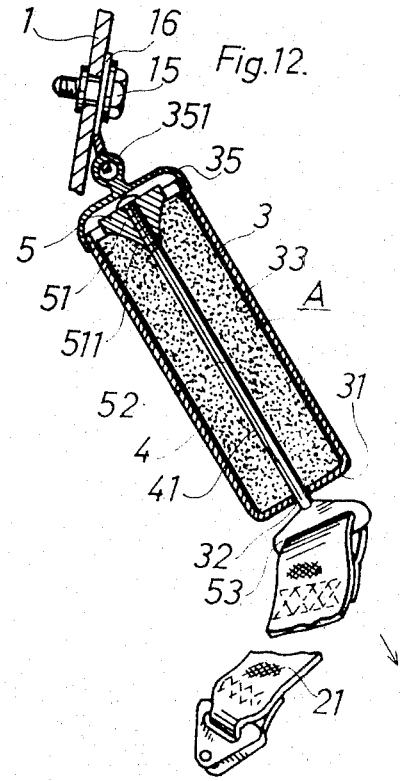
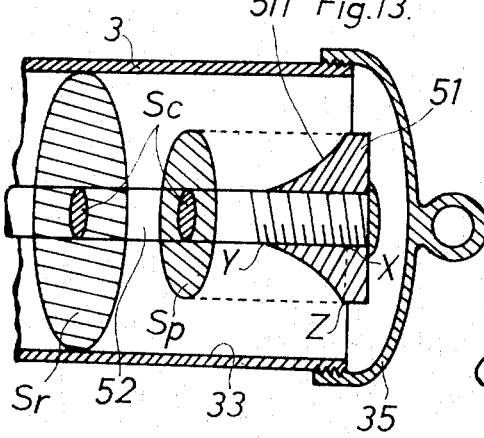
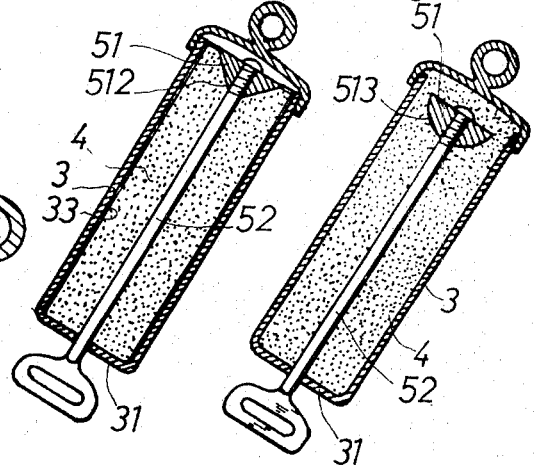

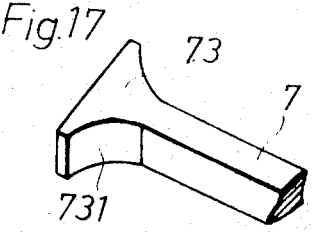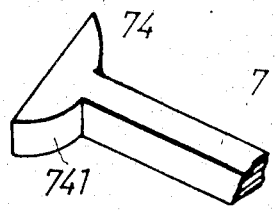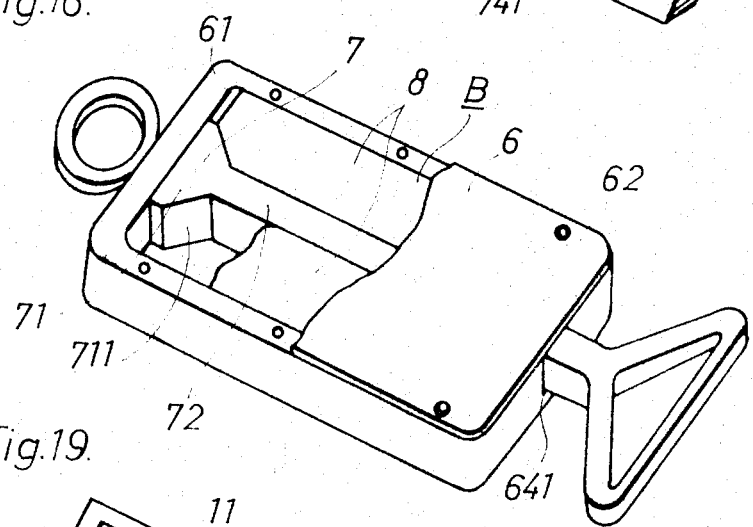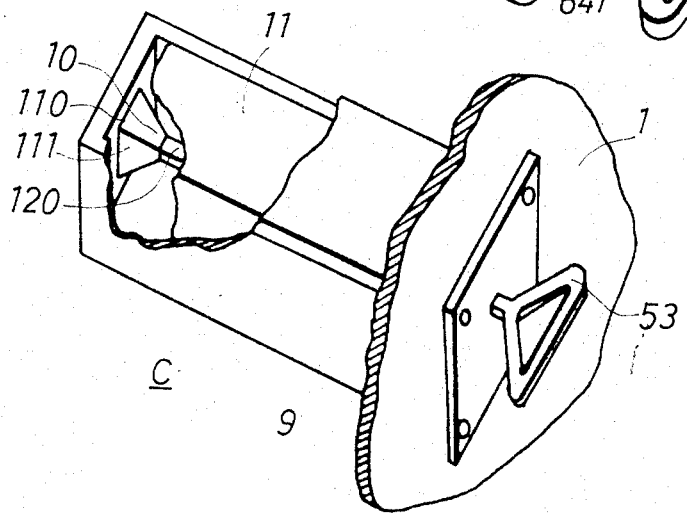

3,790,208

SAFETY BELT

CROSS-REFERENCE TO RELATED APPLICATION

This application is a Continuation-In-Part of my co-pending application Ser. No. 97,989 filed Dec. 14, 1970 now abandoned.

BACKGROUND OF THE INVENTION

Although safety belts are in wide use and their use is being expanded both with respect to the installation of belts and with respect to the introduction of shoulder harnesses, nevertheless, the protection afforded by such belts is not nearly so great as is desired. The difficulty is that although such belts may restrain the wearer sufficiently to avoid the "so-called second collision" they do not provide for absorption of the kinetic energy of the wearer. As a result, the wearer can be severely injured by the force exerted by the belts themselves. One attempt to meet with this difficulty is the bag expanded by explosion. The protection provided by such a device is still in question. It is obvious that a satisfactory means of absorbing the kinetic energy of a vehicle passenger when the vehicle is subjected to sudden acceleration or deceleration is still needed.

SUMMARY OF THE INVENTION

In a safety belt assembly for holding a passenger safely in a moving vehicle, a receptacle contains a rigid cellular foam between a pusher and a bottom plate. The receptacle and the pusher are so related to the safety belt and to the vehicle that rapid deceleration or acceleration of the vehicle as by a collision causes the pusher to be drawn through the rigid foam displacing the foam toward the wall of the receptacle and destroying the foam. The kinetic energy of the passenger is absorbed in the process. The projected area of the pusher transverse to the receptacle should be about 70 percent of the transverse cross-sectional area of the rigid foam.

Accordingly, an object of the present invention is to provide a safety belt to absorb the kinetic energy developed by the movement of an occupant of a vehicle to moderate the shock and to decrease the force acting on the occupant when the vehicle is involved in a rapid acceleration or deceleration as in a collision.

Another object of the present invention is to provide a safety belt to absorb as much of the kinetic energy as possible within the range of displacement allowable by virtue of the design of the vehicle.

A further object of the present invention is to provide a safety belt comprising means to absorb the kinetic energy by the displacement and destruction of a plastics foam body.

A still further object of the present invention is to provide a safety belt comprising means to absorb the kinetic energy by destroying a plastics foam body by a pusher having a tapering pushing face.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 11 is a view in partial section of a safety belt in accordance with the present invention as mounted in a vehicle and worn by a passenger;

FIG. 12 is a cross-sectional view of a shock-absorbing device in accordance with the present invention;

FIG. 13 shows schematically relative dimensions of a portion of a shock-absorbing means;

FIGS. 14 and 15 are cross-sectional views of a shock absorbing means modified partially from the shock absorbing means of FIG. 12;

FIG. 16 is a partially broken away perspective view of the shock-absorbing means of a second embodiment of the present invention;

FIGS. 17 and 18 are partial perspective views of the modified T-shaped members of the shock absorbing means of FIG. 16; and FIG. 19 is a partially broken away perspective view of the shock-absorbing means of a third embodiment of the present invention.

DESCRIPTION OF THE PREFERRED EMBODIMENTS

In order to prevent occupants of seats from injuries due to shock in accidents of aircraft, ships or automobiles, or like vehicles hereinafter called vehicles, safety belts to hold the occupants to seats are employed. It is necessary that safety belts should be strong enough to sustain a severe impact load due to abrupt deceleration of the mass of the occupant and at the same time the safety belt should moderate the shock by absorbing the kinetic energy developed by the motion of the occupant. In the process, a slight elongation of the belt is permissible. When the elongation of the belt is too large, however, the occupant of a seat will be exposed to a secondary collision such as with an instrument board or other part of the vehicle, mechanical or otherwise, due to the displacement or movement of the occupant relative to the seat.

Therefore, the safety belt should satisfy both (1) the function of limiting the movement of the occupant and thereby preventing the secondary collision when the occupant or the vehicle occupied by him is subjected to a shock, and (2) the function of absorbing the kinetic energy developed by the occupant or the vehicle in order to moderate the shock and decrease the force acting against the occupant.

In order to accomplish both functions as mentioned above, the safety belt should be such that the load (force applied to the occupant) rises within a small displacement range at the beginning of the shock, and when the load reaches a certain value within the range insufficient to damage a human body, the displacement may increase without increasing the load acting on the belt, thereby absorbing a large amount of kinetic energy resulting from the force acting on the occupant;

also, the final displacement of the occupant is maintained within a predetermined value.

Figure 1:
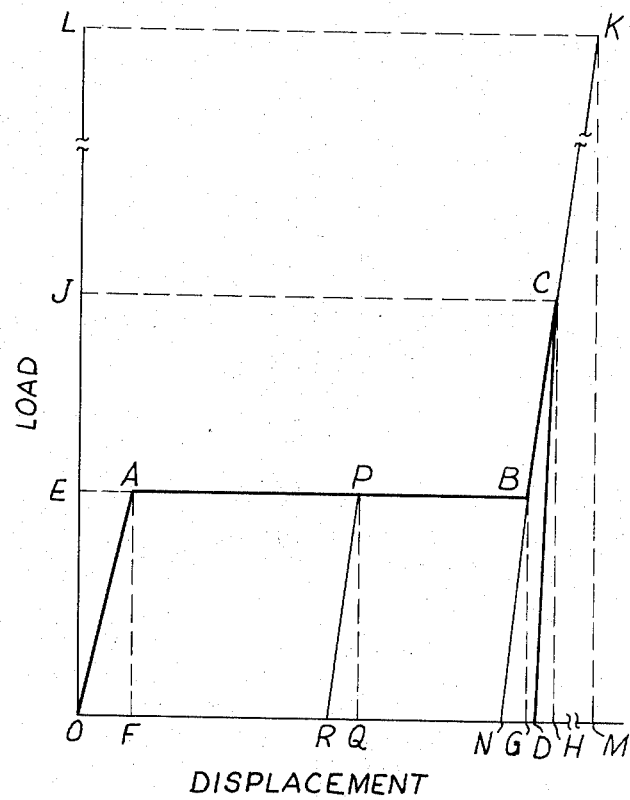
FIG. 1 is the ideal load-displacement curve of a safety belt.

FIG. 1 shows an ideal displacement-load character curve for a safety belt as mentioned hereinabove, wherein the elongation of the safety belt is shown as the abscissa and the load applied on the safety belt is shown as the ordinate. At the beginning of a shock, the curve of displacement-load rises sharply as shown by OA with a small displacement OF until the load reaches a predetermined value OE within the range insufficient to damage a human body, and then levels off at a plateau displacement as shown by AB without change in the load of OE until the displacement reaches a predetermined value OG. (The load OE at this plateau portion will be termed the plateau load hereinafter). It is necessary that the elongation of the safety belt should be limited to a value previously determined in designing of a vehicle to prevent a secondary collision. When such displacement is set to be OH, the load is increased by increasing the displacement of the belt within the displacement GH as shown by the load-displacement curve BC, taking the load OJ at the displacement OH as the maximum load to which the occupant may be safely subjected. The point K in the drawing shows the breaking point of the safety belt. The load at the breaking is shown by OL and the displacement at the breaking is shown by OM.

When the load, due to the shock, is reduced at the point C to zero, the displacement OD due to plastic deformation is retained in the safety belt. The fact that the final displacement OD is small in comparison to the maximum displacement OH at the point of C means that the belt has a high elastic recovery or a high spring action. This is not desirable since it holds the occupant too tightly and rigidly due to contraction caused by the elasticity when the shock is terminated. Accordingly, the displacement OD should preferably be as great as possible in ratio to the displacement OH, and the displacement of the former, due to plastic deformation, should preferably be near to or greater than 60 percent in percentage to the latter. (The ratio expressed in percent of the final displacement to the maximum displacement will be called the final displacement ratio or "permanent set" hereinafter.) The load OE at the points A and B should be, of course, within the range insufficient to damage a human body and it should be safely designed by setting the value of the load OJ at the point of C being markedly smaller than the load OL at the breaking point K of the belt.

When the load applied on the belt due to shock is less than the load OE, the displacement-load curve rises along the line OA, and when the shock is ended, it returns along the line OA so that there is little permanent plastic deformation, whereas when the shock is greater, the curve of displacement load proceeds along the line AB, wherein the load is not increased beyond OE and only the displacement is increased. If the shock and displacement should end at the point P, the maximum displacement would be OQ and the maximum amount of kinetic energy absorbed by a safety belt would be equivalent to the area of the quadrilateral OAPQ. Thereafter, when the shock is ended, the part of the kinetic energy absorbed by the belt is discharged and the final displacement becomes OR. Similarly, if the shock should end at the point C, the maximum absorbed energy would be equivalent to the area surrounded by the lines OA, AB, BC, CD and OD. It is preferable that the safety belt should absorb as much kinetic energy as possible within the range of displacement allowable in vehicles as designed. For this purpose, a safety belt is ideal when it has the properties of a long plateau displacement at plateau load within said displacement range, and a high plateau load within the range insufficient to damage a human body (occupant) and with permanent set of about 60 percent or above, as shown by the curve of displacement-load in FIG. 1. Although the plateau load from the point A to point B has been shown to be constant in FIG. 1, it is, of course, sufficient if it is approximately flat.

Figure 2:
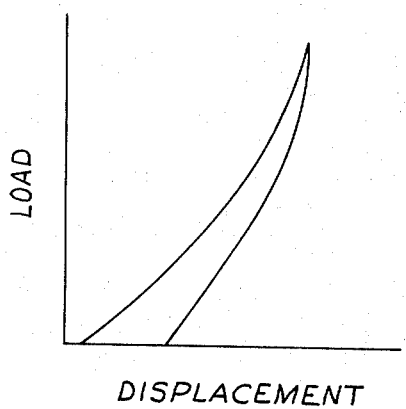
FIGS. 2 and 3 are the load-displacement curves respectively of a belt of nylon filament and of polyester filament.
Figure 3:
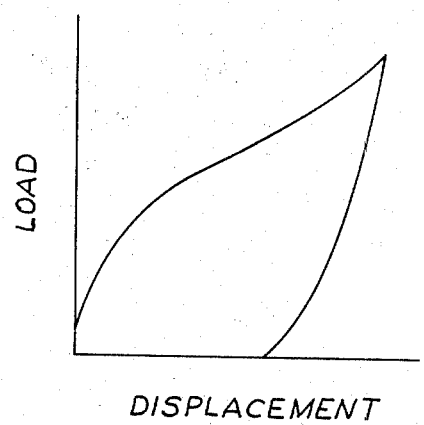

Textile belts of nylon filament or polyester filament have been employed as safety belts. The displacements caused by stretching the textile belts and the load applied on the belt have been measured. FIG. 2 shows a load-displacement curve of a nylon belt and FIG. 3 shows that of a polyester belt. As the Figures show the load increases approximately in proportion to the increase of the displacement and no plateau load such as the line A of FIG. 1 is observed. Accordingly, the amount of kinetic energy absorbed is small in comparison to the maximum displacement and the permanent set is also small. Various attempts such as blending nylon filament or polyester filament with other filaments and changing textile structures have been made, but it is very difficult to increase the absorbed kinetic energy and the permanent set due to the various defects such as decrease in the breaking load with increase in rigidity and increase in elasticity with an increase in displacement.

The inventors have endeavored to afford safety belt functions (1) and (2) hereinbefore mentioned, not by improving the materials themselves, but by providing a novel mechanism with functions to provide the desired displacement and the shock abosrption, in combined form as a function of the belt structure.

A simple and inexpensive mechanism has been devised for providing displacement and shock absorption by means of plastic deformation due to the impact load caused by the force developed by kinetic energy.

A shock absorber utilizing the viscosity resistance of oil has been broadly known, and while it may be possible to design a shock absorber that repeatedly yields a load-displacement characteristic as shown in FIG. 1, such a type of mechanical shock-absorber would tend to be too expensive and heavy. Moreover, repeated use is not always required of a shock-absorber, since a vehicle is rarely operable immediately after receiving such a degree of shock that a safety belt which absorbs large amounts of kinetic energy is actually effectuated.

From the point of view mentioned above, the inventors have disclosed in the present invention an inexpensive material and mechanism having a characteristic curve similar to the ideal feature shown in FIG. 1 and sufficiently inexpensive to permit abandonment after one use. From investigations of the characters of displacement-load curves of various materials, the fact that a plastics foam has the load-displacement characteristic shown by FIG. 1 and that the values of the plateau load and the plateau load displacement depend on density of the plastic foam, provides a basis for this development.

The present invention has been established by utilizing the above characteristic of plastics foams, in which a plastics foam body is joined to a belt so as to be compressed when tension is applied to the belt by motion of the wearer. The safety belt according to the present invention relieves shock by absorbing the kinetic energy of the occupant and acts to minimize and prevent the causing of injury.

The values of the plateau load and the displacement of a plastics foam to be employed in a particular application are determined by the weight of the occupant, the velocity of the vehicle in which the safety belt is to be used, the impact resistance of the occupant and the range of motion allowable to the occupant for eliminating the probability of causing a secondary collision. A safety belt containing a foam having the density suitable to the above conditions and large permanent set should be selected. The plateau load of a plastics foam is, of course, affected by the area on which the load (force) acts and the length or height in the direction of compression and there naturally are limitations in consideration of the adaptability and purpose for use thereof. Therefore, the plastics foam, within the above limitations as to size and having a large plateau load within the range not to injure the occupant, should be of such density as to afford a large plateau displacement within the predetermined displacement range, and a large permanent set of the foam should be provided.

EXPERIMENT 1

Figure 4:
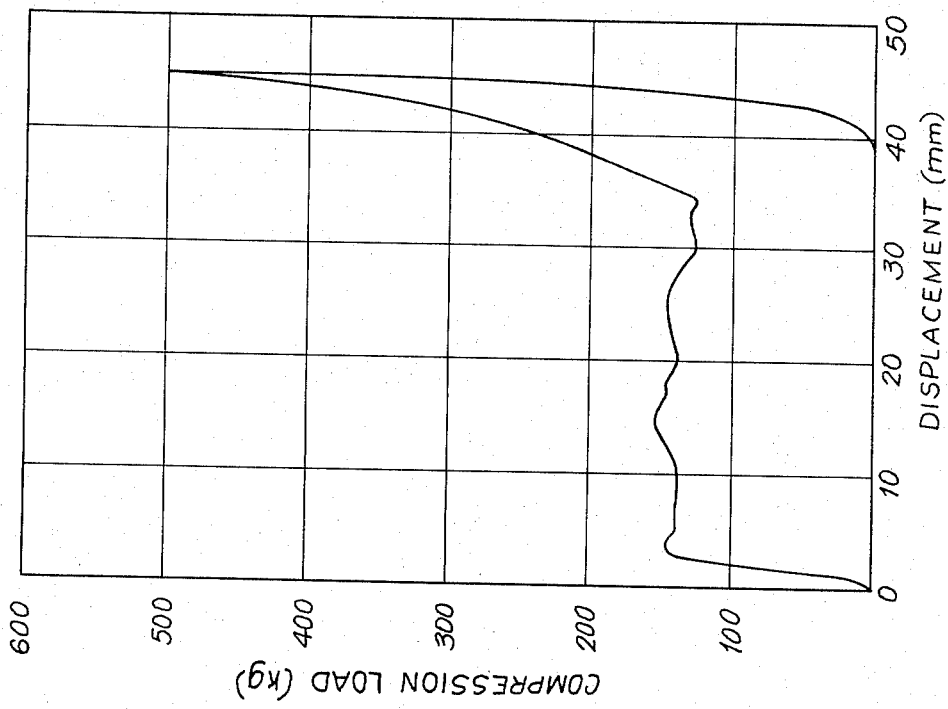

A specimen of a cylindrical shape of 40mm diameter and 50mm height prepared from a rigid polyurethane foam whose density was $0.11 g/cm^3$ was subjected to compression testing by placing the specimen with its axis in the vertical direction on an Instron type universal testing machine (ASTM : D76-'67, CONSTANT RATE-OF-SPECIMEN-EXTENSION TYPE : CRE), setting the bottom face closely on the machine and the top face closely on the pressing plate of the crosshead, and pressing down said plate at a velocity of 50mm/min. (the same being hereinafter called as the compression velocity) to compress said specimen in the axial direction. The curve of compression load-displacement obtained by measuring the load acting on the pressing plate (the same being hereinafter called the compression load) and the displacement in the axial direction of the specimen are shown in FIG. 4.

As clearly seen from the drawing, the relationship between the displacement caused by the compression of the specimen and the compression load causing said displacement is such that the load increases approximately linearly until about 3mm of displacement, after which the curve becomes approximately constant at about 140 kg, and subsequently shows a rapid rise at the position of the displacement over 35 mm, finally showing a permanent set of 88 percent by recovery to a final displacement of about 38 mm after the removal of the load when the compression load is about 500 kg at the maximum displacement of about 44 mm, such values being similar to the characteristics as shown in FIG. 1. It will be understood from the above that the requirements for the shock absorbing material of the safety belt are satisfied.

EXPERIMENT 2

Figure 5:
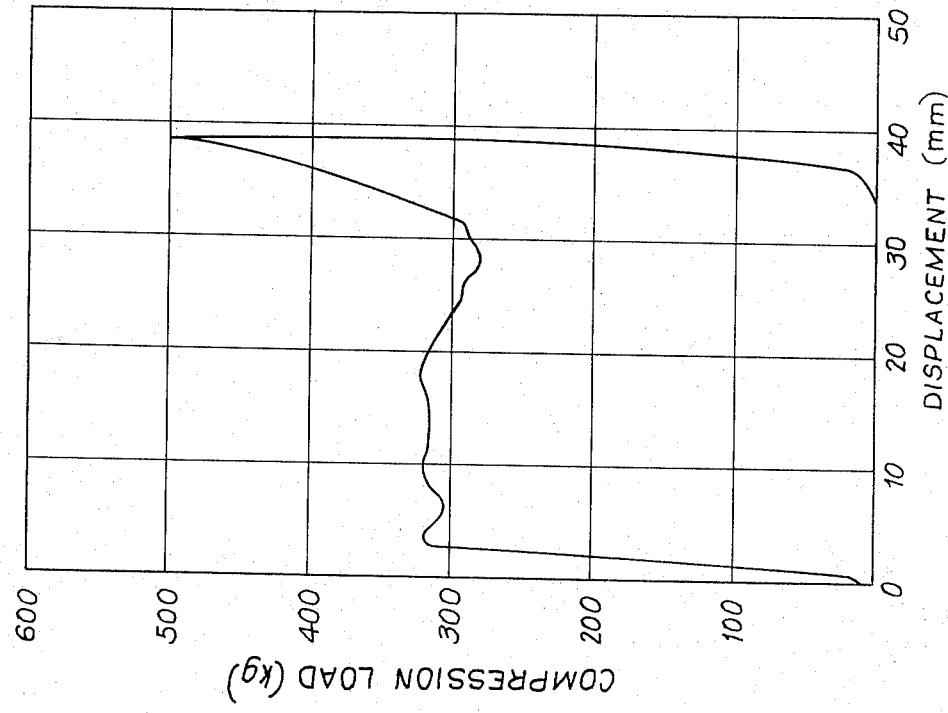
FIGS. 4 to 10 are the diagrammatic load-displacement curves of various plastics foams.

A rigid polyurethane foam of 40 mm dia., 50 mm height and $0.15 g/cm^3$ density was employed and subjected to compression testing as above. The test results are shown in FIG. 5. The plateau load was about 300 kg, the plateau load displacement was about 30mm and the permanent set was about 85 percent. The plateau load was larger than that of Experiment 1, due to the higher density of the foam employed. This latter material shows the property similar to FIG. 1 and is suitable for a shock absorbing material of a safety belt.

EXPERIMENT 3

Figure 6:
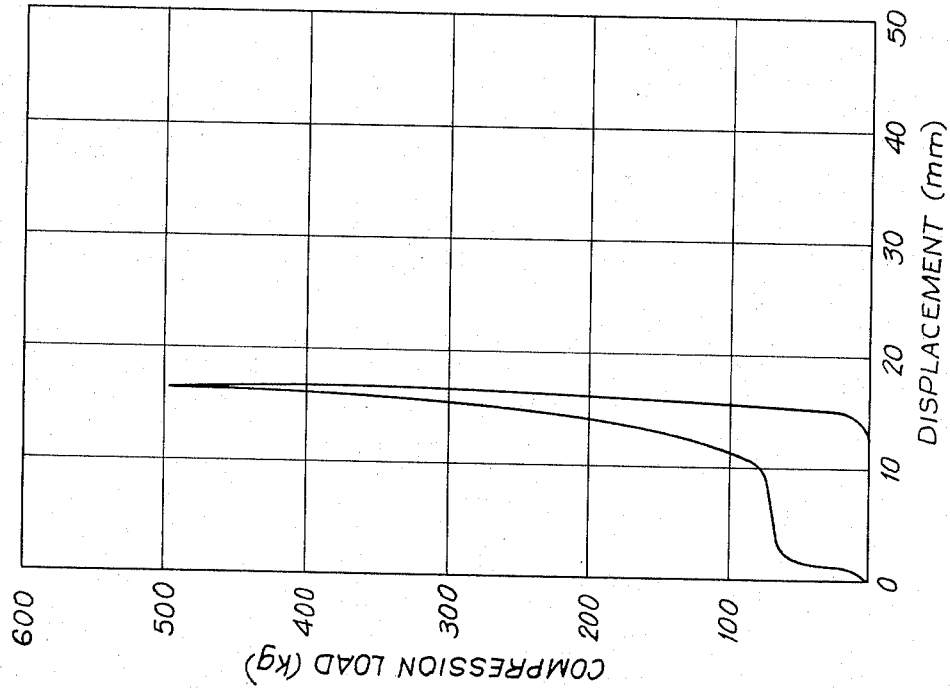

A rigid polyurethane foam of 30 mm dia., 18 mm height and $0.11 g/cm^3$ density was subjected to compression testing as in Experiment 1. The test results are shown in FIG. 6 and show the property similar to FIG. 1.

However, the plateau load was about 70 kg and the plateau load displacement was about 10 mm, which were smaller than those of Experiment 1 in spite of the same density. This is due to the differences in the area where the compression load was applied and the height. Therefore, it follows that the plateau load may be increased by increasing the foam area and the amount of displacement can be increased by increasing the foam length. The permanent set was of the preferred value, being about 71 percent.

EXPERIMENT 4

Figure 7:
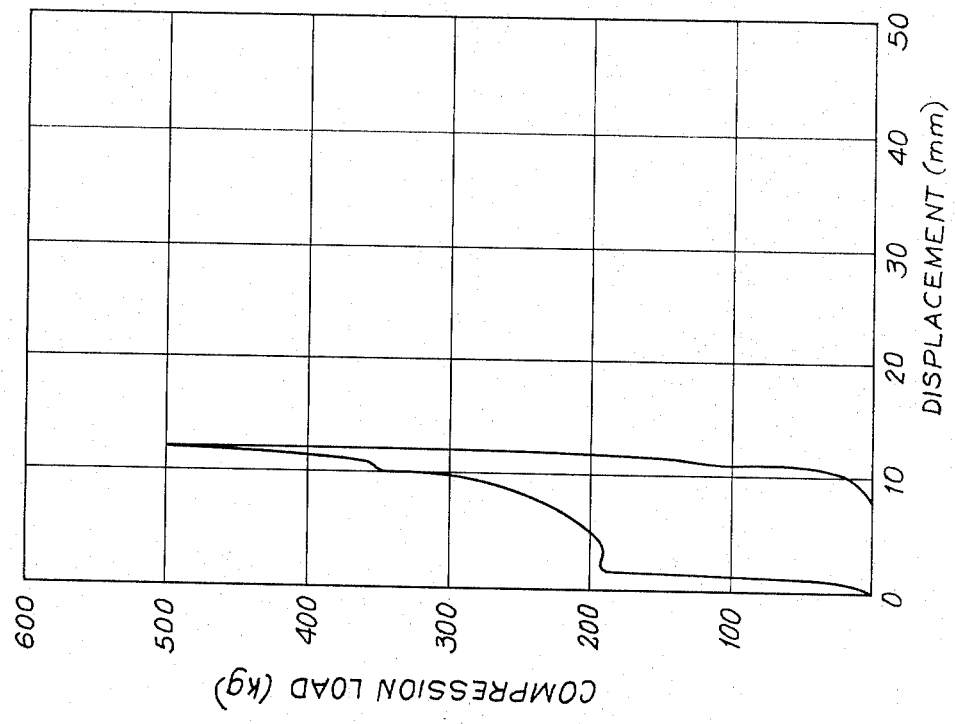

A rigid polyurethane foam of 20 mm dia., 16 mm height and $0.32 g/cm^3$ density was subjected to compression testing as in Experiment 1. The result was about 190 kg for the plateau load, about 5 mm for the plateau load displacement and about 71 percent for the permanent set as shown in FIG. 7. The particular difference, as compared with the result of Experiment 1, involves an increase of the plateau load and decrease of the plateau load displacement, this being due to the increase of density of the foam, it being understood that the plateau load increases as the density increases, while the plateau load displacement decreases as th density increases.

EXPERIMENT 5

Figure 8:
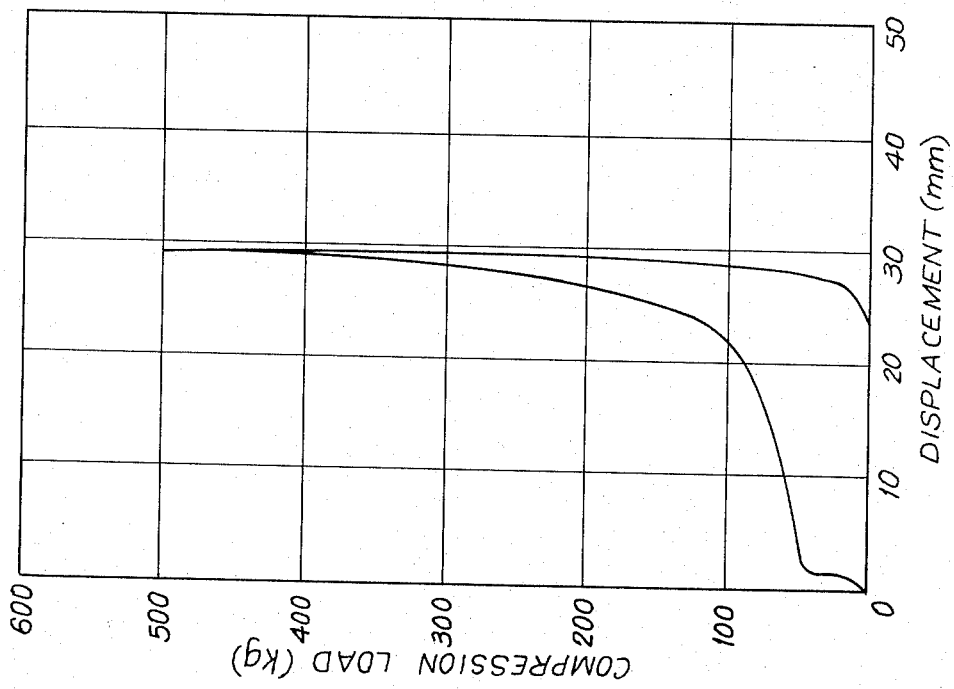

A polystyrene foam of 25 mm dia., 30 mm height and $0.08 g/cm^3$ density was employed and subjected to ocmpression testing as in Experiment 1. The test result is as shown in FIG. 8. The plateau load was 45 to 100 kg and the displacement was about 20 mm, and the displacement was conducted nearly in the condition of the plateau load. Thus, the property similar to FIG. 1 in general can be observed.

EXPERIMENT 6

Figure 9:
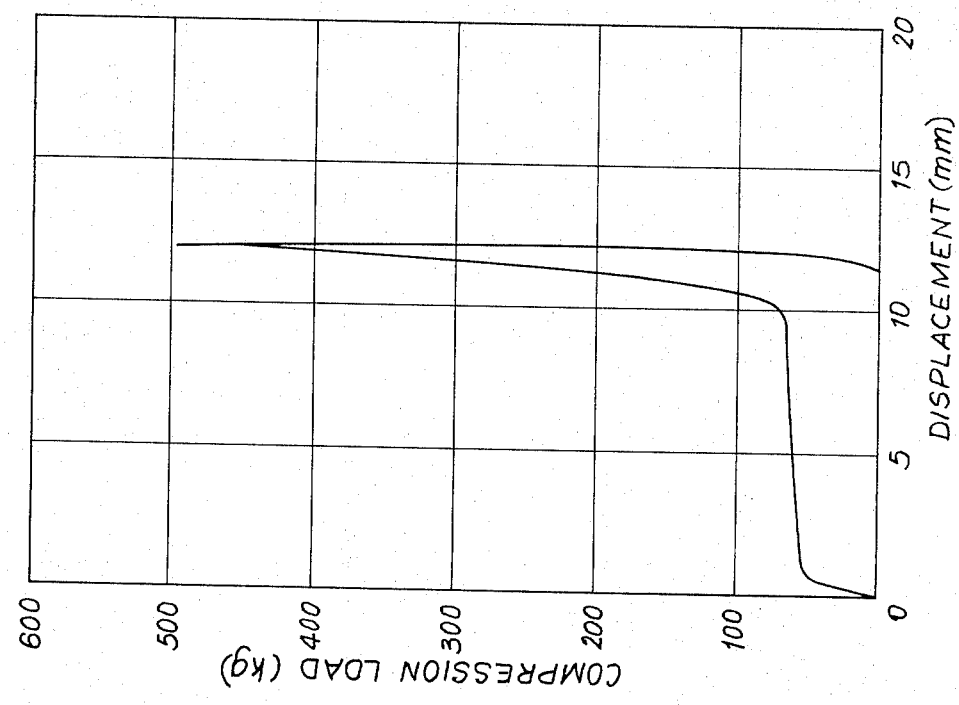

A polystyrene foam of 40 mm dia., 13 mm height and $0.029 g/cm^3$ density was employed and subjected to compression testing as in Experiment 1. The result is shown in FIG. 9. The plateau load was about 55 kg, the plateau load displacement was about 10 mm and the permanent set was about 95 percent, and the property was similar to FIG. 1.

EXPERIMENT 7

Figure 10:
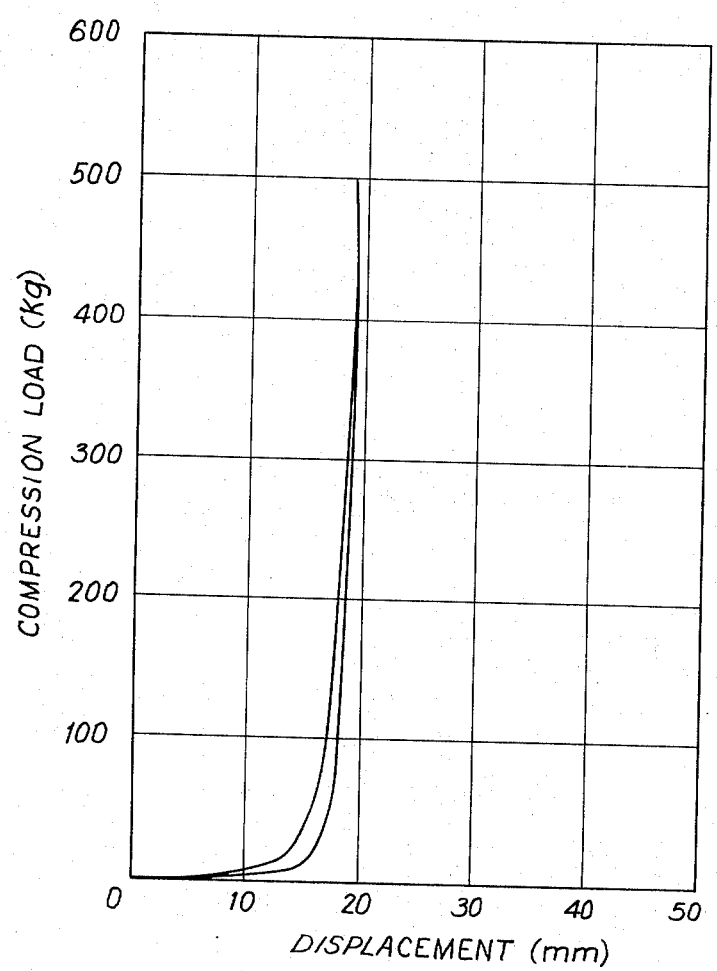

A soft polyurethane foam of 40 mm dia., 20 mm height and $0.19 g/cm^3$ density was subjected to compression testing as in Experiment 1. The test results were as shown in FIG. 10. The permanent set and the plateau load were very small: 20 percent and 5 kg, respectively. Accordingly, the amount of the absorbed kinetic energy was extremely small. A plastics foam with such a small permanent set was found to be unsuitable for shock absorbing material of the safety belt.

Although the plateau load and the plateau load displacement depend on the area on which the load acts and the height of the plastics foam, the dimensions of the plastics foam are limited in view of the manner of use such as being assembled in a safety belt. A foam having 0.02 to 0.50 g/cm³ density is suitable for practical use in a safety belt from the veiwpoint of comparatively high plateau load and plateau load displacement within the limited dimensions showing the property similar to that of FIG. 1. Further, a plastics foam having a large permanent set is effective to absorb a large amount of kinetic energy, and in practice the permanent set should be preferably more than 60 percent.

As described above, the kinetic energy is effectively absorbed and the shock can be moderated by assembling a plastics foam whose density is 0.02 to 0.50 g/cm³ and whose permanent set is above 60 percent into a safety belt so as to be compressed when an impact load acts onto a body to be protected by the belt; the intended role as a safety belt can thereby be effectively accomplished.

Details of the safety belt according to the present invention will be clearer from the description hereinafter referring to illustrative examples.

In applying the above-mentioned plastics foam to a seat belt, a shock absorbing device A comprising said plastics foam is provided between one end of a shoulder belt 21 (FIG. 11), the other end of which is connected to lap belts 22, 23 made of a suitable material such as nylon and an anchor portion 1 of a vehicle (said device being called a shock absorbing means hereinafter). Said shock absorbing device A contains a plastics foam 4 having an aperture 41 in the axial direction within a cylindrical body 3 with bottom and with one end open, and satisfying the requirements as mentioned above. A T-shaped member 5 for displacing the foam consists of a pusher 51 having a tapering pushing face 511 which in this embodiment is concave, and a connecting rod 52, one end of which is fixed axially to the central portion of the pusher 51. Said pushing face 511 abuts one end face of said plastics foam 4, and the connecting rod 52 penetrates through aperture 41 of the plastics foam 4 and an aperture 32 at the center portion of bottom plate 31 of the cylindrical body 3. A connecting means 53 formed at the end of the connecting rod 52 outside the cylindrical body 3 is turnably connected with one end of the shoulder belt 21. On assembling, for example, one end of the connecting rod 52 is inserted into the apertures 32 and 41 of the bottom plate 31 and the plastics foam 4, respectively, and said rod is screwed into said pushing plate 51. Also, a cap 35 is placed over the open end of said cylindrical body 3 and one end of the connecting plate 16 is turnably connected to a connecting means 351 provided on the center of said cap 35, the other end of said plate 16 being connected to anchor portion 1 of the vehicle by means of bolt 15. Where the shock absorbing device A is thus arranged, when a tension is caused on belt 21 due to a leaning of a human body in a vehicle caused by a shock from the rear, for example, the T-shaped member 5 acts in the direction shown by an arrow (FIG. 12) and the plastics foam 4 in a cylinder is compressed between the inner surfaces of side wall 33 and of the bottom plate 31 of the cylindrical body 3 and the pushing face 511 of the pusher 51. The part of the foam 4 broken by the edge portion of the pushing face 511 is discharged toward the side wall 33 of the cylindrical body 3 as the pusher 51 is advanced downward; energy-absorption continues until the pusher 51 contacts the bottom plate 31 of the cylindrical body 3. Therefore, a long plateau load displacement is attained with permanent set of the plastics foam. Also, the maximum absorbed energy is attained due to the long plateau load displacement. However, in order to attain the long plateau load displacement mentioned above, the pusher 51 should be provided with certain features which will be explained with reference to FIG. 13. One of the features of the pusher 51 is its projection ratio, namely the ratio of the height to the base of the pusher 51. Here, we use point Y as the highest point of the tapering pushing face 511, point Z as the lowest point of the pushing face 511 and point X as the intersectional point of the line which includes the point Y and is parallel to the connecting rod 52 and the line including the point Z which is perpendicular to the connecting rod 52. The projection ratio is defined as XY/XZ, and the ratio must be between 0.25 and 1.75. If the ratio is smaller than 0.25, the plastics foam destroyed with the pushing face will not be discharged toward the side wall 33 of the cylindrical body 3 and will be compressed between pushing face 511 and bottom 31. Therefore, the plateau load displacement will become shorter. If the ratio is larger than 1.75, the distance between the tip of the pusher and the bottom plate 31 becomes too short to attain the long plateau load displacement in a given length of the shock absorbing device A. Another significant feature of the pusher 51 is the large size of the pushing area relative to the inner cross-sectional area of the cylindrical body 3. Here, we define $S_p$ as the projected area of the pushing face 511 on a plane perpendicular to the connecting rod 52. The pushing area $S_p$ does not include the cross-sectional area $S_c$ of the connecting rod 52. $S_r$ is the cross-sectional area of the plastics foam 4 (which is also defined by the area excluding $S_c$ from the inner cross-sectional area of the cylindrical body 3). The pushing area $S_p$ must be smaller than 70 percent of the cross-sectional area $S_r$ of the plastics foam. If the pushing area $S_p$ is larger than 70 percent of the area $S_r$, a part of the broken plastics foam mentioned above will clog between the edge of said pusher 51 and the side wall 33 of the cylindrical body 3 and will cause an abrupt stopping or irregular movement of the pusher 51 on the way to the bottom plate 31, and the occupant wearing the safety belt will be injured.

FIG. 14 shows a shock absorbing means comprising a cylindrical body 3 with an inner diameter of 22mm, a bottom plate 31, a pusher 51 with a conical pushing face 512 having a bottom diameter of 12.5 mm and a projection ratio of 1 (=XY/XZ in FIG. 13), a connecting rod 52 with a diameter of 6mm and a plastics foam 4 with an outer diameter of 22mm and with an inner diameter of 6mm. Thus, the elements comprise a shock absorbing means meeting the conditions presented above. The distance between the tip of the cone-shaped pushing face 512 and the bottom plate is approximately 100mm.

Next, the shock-absorbing means was tested by pulling it to measure its plateau load, plateau load displacement and absorbed energy. Also, plastics foams with densities between 0.1 to 0.5g/cm³ were tested. The results of the tests are shown in the following chart.

| Test No. | 1 | 2 | 3 | 4 | 5 |
|---|---|---|---|---|---|
| Density of Foam | | | | | |

| (g/cm³) | 0.26 | 0.30 | 0.40 | 0.45 | 0.50 |
|---|---|---|---|---|---|
| Plateau Load (kg) | 90 | 120 | 220 | 300 | 470 |
| Plateau load displacement (mm) | 95 | 96 | 97 | 98 | 98 |
| Absorbed energy (kg.m) | 8.5 | 11 | 21 | 28 | 45 |

As seen from the chart, the plateau load displacement does not change much with variation in density of the plastics foam 4 and is almost the same as the distance, 100mm. between the tip of the conically-shaped pushing face 512 and the bottom plate 31. However, the plateau load and absorbed energy are increased with increase in density of the plastics foam 4.

The device as shown in FIG. 15 is so constructed that the pushing face 513 of the pusher 51 of a T-shaped member 51 is spherically shaped and a plastics foam 4 is integrally formed within a cylindrical body 3. Prior to forming, a T-shaped member 5 provided with a pusher 51, having a pushing face 513 of a hemspherical shape, is coated with a parting agent over its surface and placed within the cylinder 3. A liquid material from which a plastics foam can be formed is poured from a port (not shown) provided at a lower portion of the cylinder wall to fill the cylinder and then the liquid is treated to become foamed. Excess plastics material produced during the foaming stage is discharged through a port (not shown) provided at the upper portion of the cylindrical body. Thus, a shock absorbing device (means) wherein the cylinder body is filled with plastics foam and a T-shaped member 51 is imbedded within foam 4 is formed as shown in FIG. 15. Means for connecting said shock absorbing means with the anchor portion on the belt end may be similar to the previously described embodiment. As the plastics foam is integrally formed in the cylindrical body, there is no fear that the surrounding face of the foam may be damaged by the contact with the cylindrical body due to constantly applied vibrations.

FIG. 16 shows another shock absorbing means B which comprises a box-shaped body 6 with a rectangular cross-sectional area, a T-shaped member 7 with the same thickness as that of body 6 and two pieces of plastics foam 8 which are held in the body 6 and on both sides of T-shaped member 7. The box-shaped body 6 consists of a base 61 with a groove 641 and a lid 62. The T-shaped member 7 consists of pusher 71 with two inclined planar side faces 711 and a connecting rod 72 having a rectangular cross-section. The pusher 71 and connecting rod 72 may be formed integrally, or may be combined by welding. On assembling, the T-shaped member 7 and two pieces of the plastics foam 8 are put in the base 61 as shown in FIG. 16. Then, lid 62 is put on the base 61 and riveted or bolted thereto. In this embodiment, the inclination of the pushing faces 711 and the ratio of the pushing area to the compressed area are also important to attain a smooth and long plateau load displacement without abrupt stopping or irregular movement. The conditions of this embodiment are the same as the conditions explained with FIG. 13. When the T-shaped member 7 connected to a belt is pulled, the inclined planar faces compress and destroy the plastics foams 8 and displace a part of the destroyed plastics foams from both edges of the pushing faces 711. Other T-shaped members having a constant thickness of the shock absorbing means B can be also employed For example, a T-shaped member having a tapering pusher 73 with concave pushing faces 731 (see FIG. 17) or having a tapering pusher 74 with convex pushing faces 741 (see FIG. 18), may be employed and will be able to absorb the kinetic energy with a relatively long plateau load displacement.

FIG. 19 shows further shock absorbing means C connected to an anchor portion 1 of a vehicle such as a wall of the vehicle. This shock-absorbing means C comprises a box-shaped body 9 with a square inner cross-section, a T-shaped member 10 having a pusher 110 with pushing faces 111 comprising a frustum of a pyramid and a connecting rod 120, and a box-shaped plastics foam 11 with an aperture therethrough having the same cross-section as that of rod 120. The inclination of the pushing faces 111 and the ratio of the projected area of the pusher 110 to the compression area are chosen to meet the specification given above.

In the above illustrative embodiments, shock-absorbing means in which plastics foam is provided within a receptacle having a uniform cross-sectional area and between a pushing face of a T-shaped member and a bottom plate of the receptacle, are explained in detail. However, it is not always necessary to employ a T-shaped member with the pusher for compressing the plastics foam body. The pusher may be assembled in any manner so that said pusher is movable toward the bottom plate of the receptacle so as to compress and displace the plastics foam and to absorb the kinetic energy developed.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

It will thus be seen that the objects set forth above, among those apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A combination safety belt for vehicles comprising a plurality of belts for tightly holding an occupant to be protected to a seat by mutually engaging each of the free ends of at least two belts fixed by each of the other ends to anchoring portions of a vehicle, said safety belt being characterized in that one of said belts is provided with shock absorbing device along its longitudinal direction, said shock absorbing device comprising a rigid plastics foam body, a receptacle with a bottom plate holding said plastics foam body, and a pusher with a tapering pushing face situated to hold said plastics foam body between said bottom plate and said tapering pushing face within said receptacle, a tapering pushing face being one which decreases in transverse area in the direction in which said face moves during absorption of shock, the projected pushing area of said tapering pushing face being smaller than 70 percent of the cross sectional area of the plastics foam body and the projection ratio of said tapering pushing face being between 0.25 and 1.75, said pusher and receptacle being so connected to said safety belt that stress on said safety belt moves said pusher toward said bottom plate, thereby compressing and crushing said plastics foam body between said pushing face and the inner side wall of said receptacle and displacing said crushed plastics foam body toward said inner side wall, whereby the kinetic energy developed by the movement of the occupant against the belt is absorbed by the structural compression and crushing of said plastics foam body when a shock is applied to said vehicle, the restraining force exerted by said safety belts against said occupant being essentially constant and within tolerable limit during said structural compression.

2. A device in accordance with claim 1, wherein the aforesaid structural compression causes cellular destruction.

3. A safety belt according to claim 1, wherein a rigid plastics foam body having density of 0.02 to 0.5 g/cm³ and a permanent set of above 60 percent is used.

4. A safety belt according to claim 3, wherein said rigid plastics foam body is a rigid polyurethane foam body having density of 0.02 to 0.5 g/cm³ and a permanent set of above 60 percent.

5. A safety belt according to claim 3, wherein said rigid plastics foam body is a rigid polystyrene foam body having density of 0.02 to 0.5 g/cm³ and a permanent set of above 60 percent.

6. A safety belt according to claim 1, wherein said receptacle is a cylindrical body having a bottom plate and said pusher has a round base.

7. A safety belt according to claim 6, wherein said tapering pushing face is conically shaped.

8. A safety belt according to claim 6, wherein said tapering pushing face is spherically shaped.

9. A safety belt according to claim 6, wherein said bottom plate has a hole therethrough and said pusher is fixed to a rod proximate the top of said receptacle, said rod passing through said hole in said bottom plate.

10. A safety belt according to claim 9, wherein said plastics foam body is a cylindrical body with an axial penetrating hole and said connecting rod penetrates said penetrating hole of said plastics foam body.

11. A safety belt according to claim 1, wherein said receptacle is a box-shaped body with a square cross-section and said tapering pushing faces are pyramidal.

12. A safety belt according to claim 11, wherein said pusher is joined to a connecting rod at the top of said pyramid-shaped pushing faces said plastics foam body and said bottom plate have a central hole therethrough, and said connecting rod penetrates said central hole in said plastics foam body and that of said bottom plate of said box-shaped body.

13. A safety belt according to claim 1, wherein said receptacle is a box-shaped body with a rectangular cross-sectional area and said pusher has the same constant thickness as the length of the shorter side of said cross-sectional area.

14. A safety belt according to claim 13, wherein said tapered pushing faces consist of two inclined plane surfaces.

15. A safety belt according to claim 13, wherein said tapered pushing faces consist of two concave surfaces.

16. A safety belt according to claim 13, wherein said tapered pushing faces consist of two convex surfaces.

17. A safety belt according to claim 13, wherein said bottom plate has a central hole therethrough and said pusher is provided with a connecting rod which penetrates said central hole of said bottom plate of said box-shaped body and said box is provided with two plastics foam bodies situated on both sides of said connecting rod within said box-shaped body.

* * * * *